May 23, 1961 N. H. CLOUGH ET AL 2,985,876
AERIAL SYSTEMS

Filed Nov. 8, 1957 2 Sheets-Sheet 1

INVENTORS
Newsome Henry Clough, and
Mieczyslaw Wielobob,
By: Baldwin & Wight
their ATTORNEYS

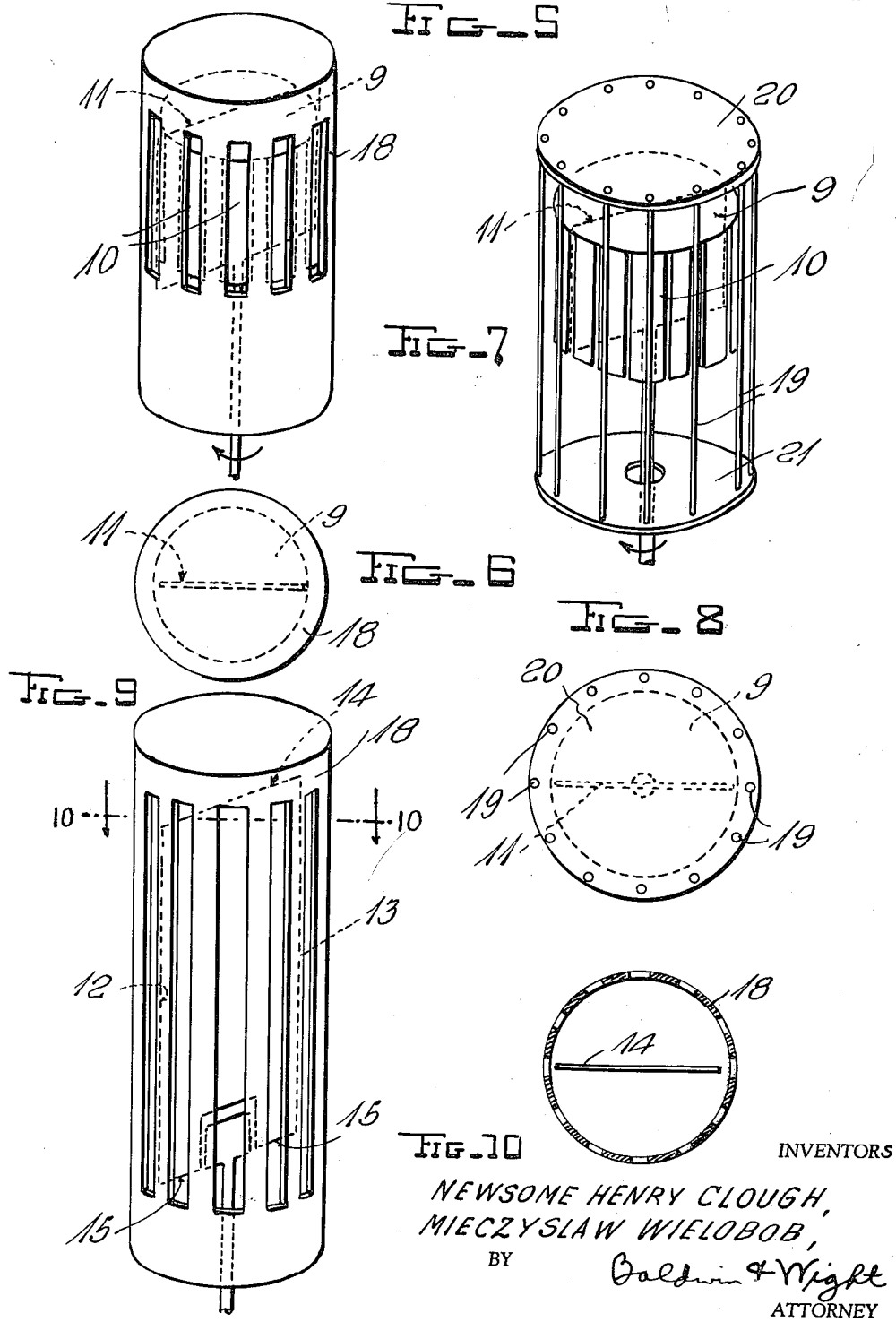

United States Patent Office 2,985,876
Patented May 23, 1961

2,985,876
AERIAL SYSTEMS

Newsome Henry Clough, Brentwood, and Mieczyslaw Wielobob, Chelmsford, England, assignors to Marconi's Wireless Telegraph Company Limited, London, England, a British company Filed Nov. 8, 1957, Ser. No. 695,456

Claims priority, application Great Britain Jan. 23, 1957

6 Claims. (Cl. 343—124)

This invention relates to aerial systems for use on very high and ultra high frequencies and has for its object to provide improved very high and ultra high frequency aerial systems of rotatable directivity which, when used for transmission purposes, may be employed as radio beacons and when used for reception purposes may be employed as radio direction finders.

Considerable difficulties are encountered in practice in designing satisfactory radio beacons and radio direction finders for use on very high and ultra high frequencies. The familiar expedient of employing an aerial system consisting for example of two mutually perpendicular aerials connected to the stator of a radio goniometer instrument whose rotor is connected to a transmitter or a receiver, as the case may be, becomes increasingly unsatisfactory practically as the frequency becomes higher and a point is soon reached when this type of system is not regarded as practically satisfactory at all. Recourse is therefore commonly made to the use of a rotating directional aerial with a figure-of-eight diagram. An example of this is the known system in which a rotating horizontal dipole is mounted within a circularly sectioned waveguide or tower having a ring of resonant longitudinal slots parallel to one another and uniformly distributed around the tower. Although known arrangements such as this are electrically satisfactory, if accurately made and precisely installed, there are obvious mechanical disadvantages inherent in the revolution of devices such as dipoles and systems of this nature are, therefore, in general, expensive and difficult to make, install and maintain.

The present invention seeks to provide improved systems which are both capable of satisfactory use at high frequencies and free from the mechanical difficulties inherent in mechanical rotation.

According to this invention in its broadest aspect an aerial system of rotatable directivity comprises at least one set of similar main aerials disposed at equal intervals round a central axis, said main aerials being arranged in pairs opposite one another, the aerials of each pair being connected together by a diametrical conductor which is shaped to form a part-turn where said conductors cross, and a small rotatable loop aerial situated on and rotatable about the said axis, said loop aerial being within and in coupling relationship to the cage of conductors constituted by the crossing part-turns.

It will be appreciated that an aerial system as defined in the preceding paragraph will not necessarily be free from zenithal error and therefore, when the invention is to be used in any of those many cases in which it is important to eliminate such error as far as possible e.g. in the case of a ground installation for assisting aerial navigation—certain of the aerial systems falling within the definition in the said preceding paragraph must be employed in combination with and centrally situated within a polarizing screen such as a set of vertical rods disposed on the surface of an imaginary cylinder with metal caps to which the rods are connected at their ends and which lie at the top and bottom of said imaginary cylinder. In place of such a screen a slotted tower or circularly sectioned waveguide as hereinbefore mentioned may be used for the same purpose.

In practice the said cage of conductors may be conveniently constituted by a hollow metal cylinder closed at one end and with its axis on the axis of the system, the curved wall of said cylinder being cut longitudinally into as many strips as there are main aerials, each main aerial being connected to a different strip and the rotatable loop aerial being mounted to project into the cylinder.

The main aerials may take any of a variety of different forms. Thus, for example, in one construction, each pair of main aerials consists of a pair of co-linear wires each extending radially outwards from the axis and connected together at their inner ends by a conductive part-turn. In a second form of construction a plurality of rectangular frames each one wavelength in periphery is employed, the vertical pair of opposite sides of each frame constituting in effect a pair of main aerials connected together at both ends, the connection at one end being shaped to form a central part-turn within which the rotatable loop aerial rotates.

In a further modification the main aerials of each pair consist each of a dipole with its halves extending parallel to the axis of the system and the adjacent ends of the halves of each dipole are connected to the corresponding ends of the halves of the other dipole by diametrical connectors each of which is shaped to form a central part-turn, the two part-turns being in opposite direction so as together substantially to circumscribe a space within which the rotatable loop rotates.

In practice the rotating loop aerial is quite a small device so that it may be rotated at high speed without mechanical difficulties. Thus to quote practical but not limiting figures, the rotating loop aerial may circumscribe an area of only about 30 sq. cms., e.g. it may be a square loop aerial on a side of about 2". Such a loop aerial is quite adequate for efficient transfer of energy at frequencies of the order of 100 mc./s.

The invention is not limited to the use of any particular number of pairs of main aerials but at least four main aerials are necessary for good results and in general the larger the number of main aerials (within practical limits) the better.

The invention is illustrated in the accompanying drawings in which:

Fig. 5 is a perspective view of the embodiment of our invention illustrated in Figs. 1 and 2 with the polarizing screen in position;

Fig. 6 is a horizontal sectional view taken substantially on line 6—6 of Fig. 5;

Fig. 7 is a perspective view of a modified form of our invention where the polarized screen consists of vertically extending electrically conducting rods secured between metal end caps and enclosing the aerial system;

Fig. 8 is a horizontal sectional view taken substantially on line 8—8 of Fig. 7;

Fig. 9 is a perspective view of the form of our invention illustrated in Fig. 3, showing the aerial system enclosed in a polarizing screen in accordance with our invention; and Fig. 10 is a horizontal sectional view taken substantially on line 10—10 of Fig. 9.

Figure 1:
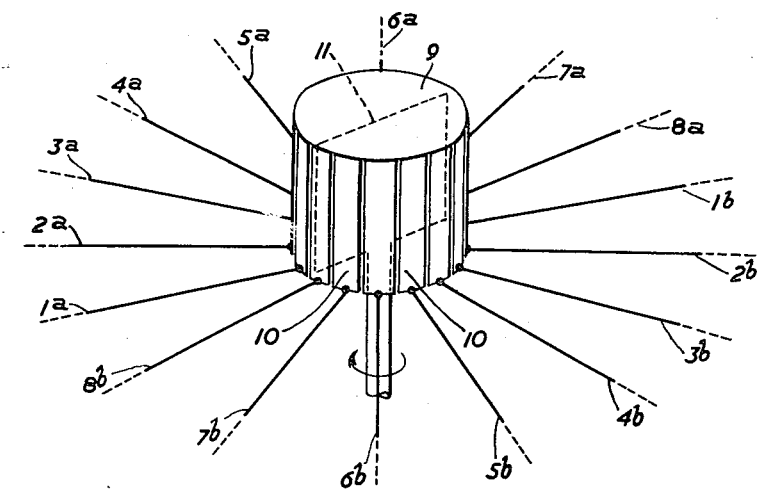
Fig. 1 is a diagrammatic perspective view of one embodiment of the invention.
Figure 2:
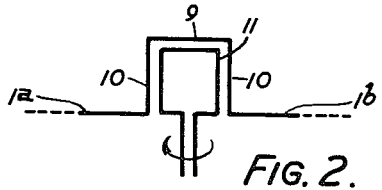
Fig. 2 is a simplified circuit diagram showing the effective circuit of the rotating loop aerial and one pair of main aerials with its connecting part-turn of an arrangement as shown in Fig. 1.

Referring to Fig. 1 the embodiment therein illustrated comprises sixteen main aerials in the form of simple horizontal wires or conductors radiating in towards a central point and evenly distributed round a circle. The aerials are in co-linear pairs $1^a$, $1^b$ to $8^a$, $8^b$ and stop a few inches short of the central point. In Fig. 1 they are shown broken away at their outer ends in order to permit the central connecting cage to be shown to a large scale. In the diagram of Fig. 2 one pair of aerials $1^a$, $1^b$ is alone represented. The aerials of each pair are connected together at the axis of the whole system by a bent conductor into the form of three sides of a vertical rectangle so as to constitute a part-turn. In preferred practice and as shown in Fig. 1, the part-turn connections between the aerials of the pairs are constituted by a cylindrical structure having a top disc 9 and having its cylindrical curved surface split by a plurality of saw cuts such as 20 which run parallel to the axis and which divide the curved portion of the cylinder into as many portions as there are main aerials. The saw cuts may continue radially into the disc top but, of course, must not meet. Each main aerial is connected at its inner end to one of the cylinder portions so that a diametrical opposite pair of such portions with the top disc 9 together provide a circuit such as diagrammatically shown in Fig. 2 in which the references 10, 9 are also used. The bottom of the cylinder is open and in its positioned a coupling loop aerial 11 (shown dotted in Fig. 1) of rectangular shape and dimensioned to fit within the cylinder and to be rotated within the same about the axis thereof. The overall electrical length of each two associated radial aerial elements such as $1^a$ or $1^b$ (including the half-turn connecting them) should be substantially one half wavelength long.

With this arrangement, when the loop aerial 11 is rotated within the cage a rotating figure-of-eight polar diagram is obtained. In effect the major coupling of the loop aerial is, as it were, smoothly transferred in turn from each pair of main aerials to the next and by providing sufficient pairs of aerials excellent results are obtained closely approximating a smoothly and progressively rotating figure-of-eight polar diagram.

The aerial system of Fig. 1 is not free from zenithal error and therefore, in cases where such error is not permissible, the aerial system is mounted centrally within a vertical polarizing screen or slotted waveguide or tower 18 as represented in Figs. 5 and 6.

Figure 3:
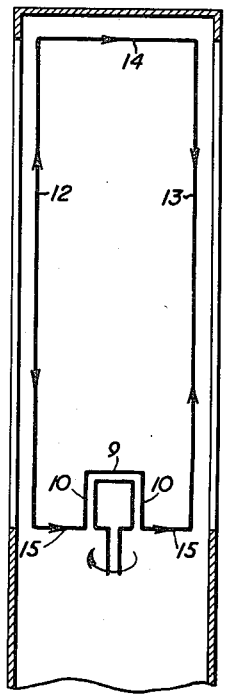
Fig. 3 is a diagrammatic view similar to that of Fig. 2 showing the loop aerial and one of a number of frames employed in a modified embodiment of the invention.

The modification shown in Fig. 3 is also liable to zenithal error. The zenithal error increases with increasing separation of the sides 12 and 13. This structure accordingly requires the use of a polarizing screen, slotted waveguide or tower shown at 18 in Figs. 9 and 10 where the zenithal error is unacceptable. Each pair of main aerials of Fig. 1 is in effect replaced by the vertical sides 12, 13 of a frame of overall peripheral length of one wavelength with a horizontal top side 14 connecting the top ends of the portions 12 and 13 and a horizontal bottom side 15 connecting the bottom sides of said portions of the connector 15 bent to form a rectangular part-turn 9—10 similar to the correspondingly referenced part-turn of Figs. 1 and 2. It will be understood that Fig. 3 shows only one of the frames employed and that there are a number of exactly similar frames having a common axis and disposed at equal angles to one another. As in Fig. 1 the part-turns may be provided by a split vertical cylinder. Arrowheads in Fig. 3 indicate the standing current directions.

Figure 4:
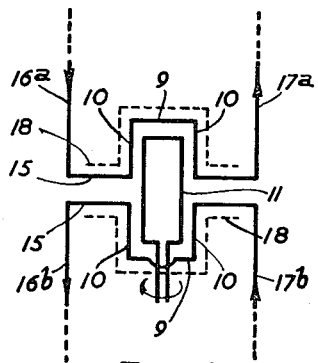
Fig. 4 is a diagrammatic view similar to those of Figs. 2 and 3 showing the rotating loop aerials and one pair of dipoles with their connections of a still further embodiment employing a number of similarly connected dipoles.

In the further modification shown in Fig. 4 each pair of main aerials of Fig. 1 is replaced by a pair of vertical dipoles $16^a$, $16^b$ and $17^a$, $17^b$. The corresponding ends of the dipole halves $16^a$, $17^a$ are connected by a connector 15 centrally bent to form a part-turn 10—9—10 while the inner ends of the dipole halves $16^b$ and $17^b$ are similarly connected. The two part-turns are bent in opposite directions so as together almost completely to circumscribe a rectangular space in which the rotating loop aerial 11 is mounted. The upper and lower sets of part-turns may, as before, be constituted each by a similar split cylinder so that there will be two similar co-linear split cylinders with their open ends towards and near one another. As in Fig. 1 the ends of the dipole halves are shown broken away. Arrow heads in Fig. 4 indicate the standing current directions. Only one pair of dipoles is shown in Fig. 4, but it is to be understood that there is a plurality of pairs of dipoles each pair lying in its own vertical plane, the planes intersecting at equal angles on the axis. Screening as indicated in broken line at 18 in Fig. 4 is provided for the part-turn cages and the horizontal wires leading therefrom, and with this arrangement a vertical polarized rotating figure-of-eight pattern is obtained.

The zenithal error heretofore alluded to arises due to the radiation by the aerial system of secondary vertical polarized components having maxima displaced 90° axially with respect to the maxima of the horizontal patterns. Consequently, the maxima of the zenithal errors will occur at a zenithal angle of 45°.

Obviously aerial systems in accordance with this invention are utilizable for transmission or for reception.

Figs. 7 and 8 illustrate the application of a polarized screen formed from electrically conducting vertically extending rods 19 connected between metal end cap 20 and annular end cap 21 for maintaining the screen around the aerial system.

While we have described our invention in certain of its preferred embodiments, we realize that modifications may be made and we desire that it be understood that no limitations upon our invention are intended other than may be imposed by the scope of the appended claims.

We claim:

1. An aerial system having rotatable directivity in a plane at right angles to the axis of the system comprising at least one set of similar main aerials disposed at equal intervals round a central vertical axis, said main aerials being arranged in pairs opposite one another, the aerials of each pair being connected together by a diametrical conductor which is shaped to form a part-turn where said conductors cross, said part-turn defining a portion of the aerials from which energy is radiated, and a small rotatable loop aerial situated on and rotatable about the said axis, said loop aerial being within and in coupling relationship to the cage of conductors constituted by the crossing part-turns, whereby a rotating figure-of-eight polar diagram is produced in a horizontal plane.

2. An aerial system as set forth in claim 1 in combination with and centrally situated within a polarizing screen wherein the polarizing screen is constituted by a set of vertical rods disposed on the surface of an imaginary cylinder with metal caps to which the rods are connected at their ends and which lie at the top and bottom of said imaginary cylinder.

3. An aerial system as set forth in claim 1 wherein said cage of conductors is constituted by a hollow metal cylinder closed at one end and with its axis on the axis of the system, the curved wall of said cylinder being cut longitudinally into as many strips as there are main aerials, each main aerial being connected to a different strip and the rotatable loop aerial being mounted to project into the cylinder.

4. An aerial system as set forth in claim 1 wherein each pair of main aerials consists of a pair of co-linear wires each extending radially outwards from the axis and connected together at their inner ends by a conductive part-turn.

5. An aerial system as set forth in claim 1 wherein a plurality of rectangular frames each one wavelength in periphery is employed, the vertical pair of opposite sides of each frame constituting in effect a pair of main aerials connected together at both ends, the connection at one end being shaped to form a central part-turn within which the rotatable loop aerial rotates.

6. An aerial system as set forth in claim 1 wherein the main aerials of each pair consist each of a dipole with its halves extending parallel to the axis of the system and the adjacent ends of the halves of each dipole are connected to the corresponding ends of the halves of the other dipole by diametrical connectors each of which is shaped to form a central part-turn, the two part-turns being in opposite direction so as together substantially to circumscribe a space within which the rotatable loop rotates.

References Cited in the file of this patent

UNITED STATES PATENTS

| | | |
|---|---|---|
| 1,988,006 | Greig | Jan. 15, 1935 |
| 2,221,946 | Holsten et al. | Nov. 19, 1940 |
| 2,271,517 | Cockerell | Feb. 3, 1942 |
| 2,601,610 | Hatch, et al. | June 24, 1952 |
| 2,640,930 | Lundberg, et al. | June 2, 1953 |

FOREIGN PATENTS

| | | |
|---|---|---|
| 761,110 | Germany | Sept. 14, 1953 |